United States Patent [19]

Gumerman

[11] 4,181,705

[45] Jan. 1, 1980

[54] PURIFICATION OF FLUIDIZED-BED COMBUSTION FLUE GAS

[75] Inventor: Raymond J. Gumerman, Walnut Creek, Calif.

[73] Assignee: Chevron Research Company, San Francisco, Calif.

[21] Appl. No.: 935,052

[22] Filed: Aug. 18, 1978

[51] Int. Cl.² ............................................ B01D 53/34
[52] U.S. Cl. ..................................... 423/235; 110/345
[58] Field of Search ...................... 423/239, 351, 235; 110/345; 431/4

[56] References Cited

U.S. PATENT DOCUMENTS

| | | | |
|---|---|---|---|
| 3,746,498 | 7/1973 | Stengel | 423/235 |
| 3,862,296 | 1/1975 | Dotson et al. | 423/351 |
| 3,900,554 | 8/1975 | Lyon | 423/235 |
| 4,115,515 | 9/1978 | Tenner et al. | 423/235 |

OTHER PUBLICATIONS

Kraus et al., "Hydrocarbon Processing", May 1978, pp. 143–145.

*Primary Examiner*—G. O. Peters
*Attorney, Agent, or Firm*—D. A. Newell; R. H. Davies; W. D. Reese

[57] ABSTRACT

Nitrogen oxides levels in flue gas produced in fluidized-bed combustion systems are lowered by introducing ammonia directly into the fluidized bed.

4 Claims, 1 Drawing Figure

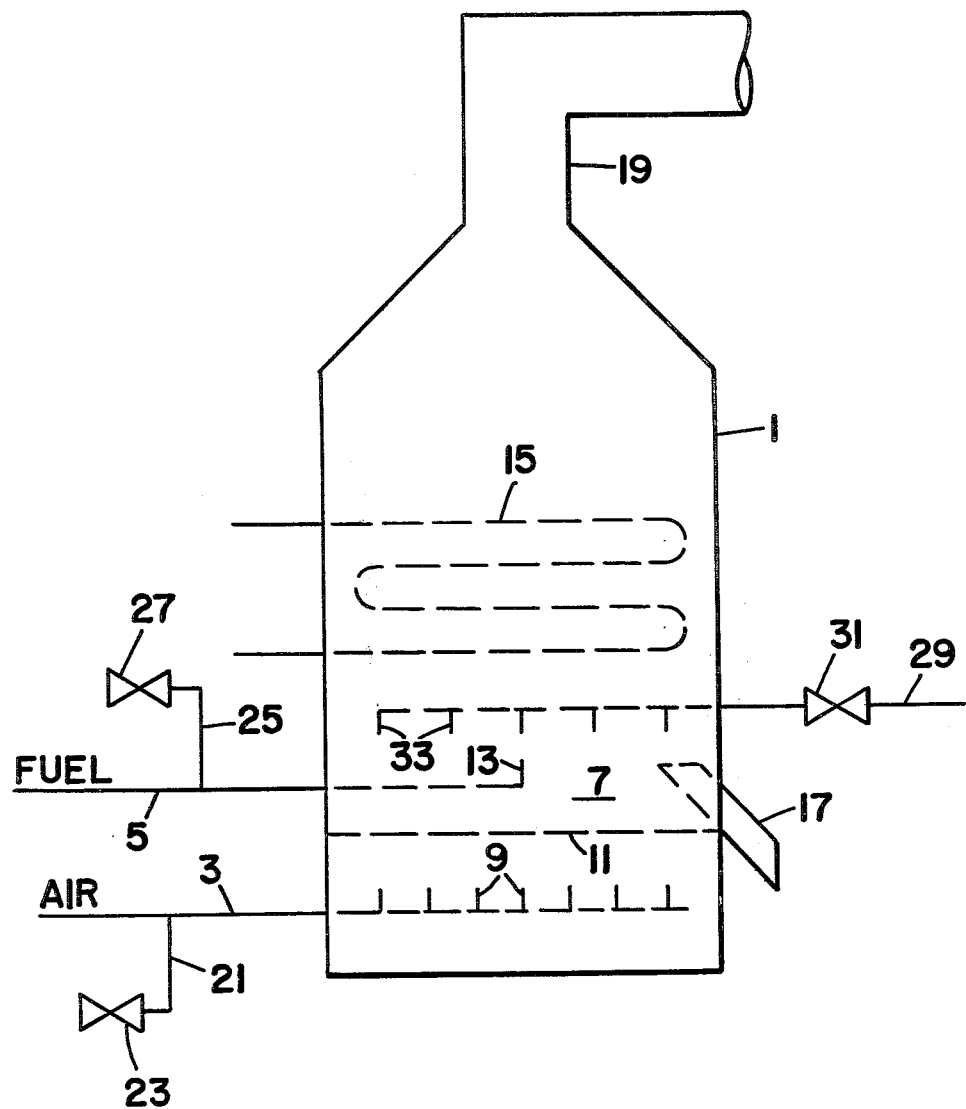

PURIFICATION OF FLUIDIZED-BED COMBUSTION FLUE GAS

BACKGROUND OF THE INVENTION

The present invention relates to a method for lowering nitrogen oxides levels in a flue gas produced in fluidized combustion of particulate solid fuels or heavy oils or tars.

Fluidized combustion of particulate solid fuels such as coal is well known. Processes of this type are disclosed, for example, on pages 143-150 of "Hydrocarbon Processing" magazine, May 1978. Typically, particles of fuel are introduced into a combustion chamber above an air distribution grid. A stream of air is introduced below the grid to fluidize the coal. The coal is burned in the resulting fluidized bed, normally at a temperature of 1400° to 1600° F., i.e., at a temperature substantially below the temperature used in conventional furnaces. The temperature range used in fluidized bed combustion systems is a particularly good one for reacting sulfur oxides with Group IIA metal oxides. For this reason, particulate limestone, dolomite or the like can advantageously be added to the fluidized combustion bed in order to remove sulfur oxides from the combustion product gases. Thus, sulfur oxide emissions from sulfur-containing fuels can be substantially reduced by burning them in a fluidized-bed combustion system. This allows the burning of relatively high-sulfur coals without excessive air pollution.

Nitrogen oxides are invariably generated to some extent during combustion of solid or heavy liquid fuels with air. In order to control air pollution, it is desirable to vent to the atmosphere a flue gas which has as small a nitrogen oxides concentration as possible. The art is therefore continually concerned with decreasing the level of nitrogen oxides in gases generated in burning coals and other fuels, both in fluidized-bed combustion systems and in conventional furnaces.

It has been suggested in U.S. Pat. No. 3,900,554 to remove nitrogen oxides from flue gases in conventional furnaces by mixing the effluent from a combustion system with ammonia at a temperature of 1600°-2000° F. and in the presence of oxygen, to reduce NO. In the 1600°-2000° F. temperature range utilized, ammonia is asserted by the patent to reduce NO without the use of a catalyst. Many other patents have suggested the use of ammonia with metal oxidation-reduction catalysts to reduce NO and potentially other nitrogen oxides in flue gas. Exemplary of such catalytic reduction processes, which typically operate at temperatures of 100-500° C., are U.S. Pat. Nos. 4,070,440 (alpha-$Fe_2O_3$ catalyst), 4,056,600 ($V_2O_5/Mn_2O_3$ catalyst), 4,049,777 (CrO catalyst), 4,031,185 (Cu-halide catalyst), 4,010,238 (various transition metal catalysts), 4,002,723 (noble metal catalysts), 3,895,094 (zeolite catalyst), 3,864,451 (various catalysts) and 3,887,683 (activated charcoal catalyst).

Several U.S. Pat. Nos., for example 3,894,141 and 3,867,507, suggest using a hydrocarbon rather than ammonia in order to reduce nitrogen oxides.

SUMMARY OF THE INVENTION

The present invention relates to an improvement for use in a process including the steps of (1) forming a fluidized bed of a particulate solid fuel including at least one nitrogen compound by passing a gas stream upwardly through the particulate fuel in a combustion zone, (2) forming NO-containing gaseous combustion products by combusting the fuel in the fluidized bed with molecular oxygen at an average temperature in the bed of about 1400° F. to about 1800° F. and, (3) removing the gaseous combustion product from the bed; wherein the present invention relates to a method for decreasing the amount of NO in the gaseous combustion product which comprises: introducing ammonia or an ammonia liberating compound into the bed and forming molecular nitrogen from the NO in the bed by reacting the ammonia with the NO and oxygen.

I have found that ammonia can be introduced into a fluidized bed along with solid fuel and air used for fluidization and combustion in a fluidized-bed combustion system, and that the ammonia is effective in this mode for removing NO from the gaseous combustion products generated in the bed, even though the average temperature employed in the bed is below those generally recognized to be thermodynamically effective for the reaction between ammonia, oxygen and NO. Moreover, I have found that the use of both ammonia and a Group IIA metal in a fluidized-bed combustion system permits both extensive removal of nitrogen oxides and also extensive removal of sulfur oxides from the gaseous combustion products. This allows both of the primary pollutants in flue gas from combustion systems to be removed in a single operation using conventional equipment in the fluidized-bed combustion system itself, not dependent upon addition of extraneous apparatus.

DESCRIPTION OF THE DRAWING

The attached drawing is a schematic representation of a fluidized-bed combustion system in which one or more preferred embodiments of the method of the present invention can be practiced.

Referring to the drawing, there is shown a combustor vessel 1 into which combustion supporting and fluidizing air is introduced through a conduit 3. Particulate, sulfur-containing and nitrogen-containing solid fuel is introduced into the combustor 1 through a conduit 5. The air stream thus introduced is fairly evenly distributed over a horizontal cross-section in a fluidized combustion zone 7 within the vessel 1 by a plurality of distribution ports 9 and a perforate distribution grid 11. The particulate fuel is passed into the combustion zone through an inlet port 13. The upwardly flowing air stream fluidizes the particulate fuel in the combustion zone 7, and molecular oxygen in the air is reacted with the fuel to provide heat. Heat is absorbed for use outside the combustion system by water or steam, as in a steam generation coil 15 which is exposed to the burning gases in the fluidized bed 7. Nitrogen oxides and sulfur oxides are formed during combustion of the fuel. Sulfur oxides thus formed are reacted with particulate limestone introduced into the fluidized bed along with the fuel so as to form sulfur-containing solids, e.g., calcium sulfate, in the limestone. Coal, ash and sulfur-containing solids are removed from the combustion zone through an ash outlet conduit 17. Flue gas is removed from the vessel 1 through a flue 19 and the flue gas may thereafter be treated to remove, for example, small particulates, residual sulfur oxides, and the like. According to one preferred embodiment of the present invention, ammonia or an ammonia precursor is introduced into the combustion zone by passing it through a conduit 21, at a rate controlled by a valve 23, into the air introduction conduit 3, wherein it passes to the ports 9 and the grid 11 and then into the combustion zone 7. In the combustion zone, the ammonia reacts with NO and oxygen as the NO forms at particularly hot points closely adjacent to burning fuel particles. The NO is thereby reduced to harmless molecular nitrogen, and water is also formed. The flue gas may then be removed from the combustion zone with a lower nitrogen oxides content than would otherwise be the case. In an alternate preferred embodiment, the ammonia is introduced into the combustion zone 7 along with the particulate fuel, as by passing the ammonia or its precursor from conduit 25, at a rate controlled by valve 27, into the fuel introduction conduit 5. In another alternative embodiment, the ammonia is introduced into the vessel 1 through a conduit 29 at a rate controlled by a valve 31 and is then passed into the combustion zone 7 through a plurality of ports 33. The ammonia in conduit 29 may be diluted by steam or air to achieve good distribution in bed 7. The ammonia can be introduced into the combustion zone 7 by any one of the ways shown or by any two or by all three of the ways shown, if desired. Various necessary, conventional items of equipment, such as pumps, controllers, etc., are not shown. The use of such equipment and its placement in the operation described will be readily apparent to those skilled in the art.

DETAILED DESCRIPTION OF THE INVENTION

The method of the present invention is applicable to fluidized-bed combustion systems in which the average temperature in the fluidized-bed combustion zone is about 1400° F. to 1800° F. The 1400°–1600° F. temperature range is preferred in that it is particularly adapted for the use of Group IIA metals for removing sulfur oxides from the combustion system by reaction with Group IIA metals or metal oxides to form particulate solids.

Any convenient and practical type of particulate solid nitrogen-containing fuel can be used. Coal, coke, lignite, peat, oil shale and wood are examples of suitable nitrogen-containing and sulfur-containing materials which can be burned in a combustion system employing the present invention. Heavy fuels such as residuum and SDA asphalt are also suitable, although they may be semi-liquid in some cases. Therefore, these materials are included within the term "particulate solid fuel", as used herein. Coal is a particularly preferred fuel. The particle size used in a given fluid-bed combustion system will depend on the design of the particular system, and the particle size can, in any given case, be readily determined by one skilled in the art for the particular application. Air is the only practicable oxygen-containing gas for use in commercial embodiments of fluid-bed combustion systems, and is thus preferred in systems employing the method of this invention.

Preferably, ammonia or an aqueous solution of ammonium hydroxide is used in carrying out the invention. Other suitable ammonia-liberating compounds include ammonium carbonate, ammonium formate, ammonium oxylate, ammonium citrate, and compounds of a similar type which include anions which react to form water and carbon dioxide upon complete combustion. The ammonia utilized can be introduced into the fluidized bed of fuel, combustion products and residue in any convenient manner. In one preferred mode of introduction, ammonia or an ammonia precursor is introduced into the fluidized bed in admixture with the fluidizing gas, which also may be the sole source of molecular oxygen used in the system for supporting combustion. Additionally, oxygen may be introduced into the bed from one or more other sources, if desired, and the ammonia can be introduced into the bed in combination with any one or more of the various possible ancillary gas streams, such as molecular oxygen streams, which may be employed in specific embodiments of fluid-bed combustion systems. In another preferred mode of operation, ammonia or an ammonia precursor is introduced into the bed in admixture with the particulate fuel. For example, the fuel particles can be impregnated with a suitable ammonia precursor, or ammonia can be mixed with the gas used to convey the particles of fuel into the fluidized bed. In a third alternative mode of introduction, ammonia can be separately introduced into the fluidized bed by, for example, introducing a liquid solution of ammonia through introduction and distribution means specifically designed for the sole purpose of introducing ammonia or an ammonia precursor into a fluidized bed of fuel at a relatively uniform concentration throughout the bed or throughout any desired portion of the bed.

Generally, the method of this invention is used in a fluid-bed combustion system in which a fuel is used which contains a sulfur component. Sulfur is typically present in coal and in similar particulate solids. When the coal is burned, sulfur oxides are formed. At temperatures of 1400°–1800° F., sulfur oxides formed during combustion of the coal react readily with calcium oxide and possibly other Group IIA metals to form sulfur-containing solids. These solids can be removed from the fluidized bed along with the ash or other solid combustion products and combustion residues. In this way, a very advantageous rate of desulfurization can be maintained in a fluidized bed without the use of extraneous gas scrubbing equipment or like additional means for removing the sulfur compounds from the flue gas. The Group IIA metals which are preferred for use in removing sulfur compounds from flue gases are calcium and magnesium, particularly calcium. Conveniently, particulate limestone or dolomite can be used, as by mixing one or both of these materials in particle form with the particulate fuel prior to using the fuel in the fluidized bed. Alternatively, one or more Group IIA metal compounds such as calcium carbonate can be impregnated on the fuel prior to its use in the combustion system.

The amount of ammonia used in the operation according to the present invention is generally within the range from a trace to 1.5 mols of ammonia per mol of NO found in the gaseous combustion products from a fluidized-bed combustion system prior to introduction of ammonia. Preferably, the amount of ammonia is between 0.5 mol and 1 mol of ammonia per mol of NO present in the combustion gases.

The following illustrative embodiment describes one specific mode of a preferred embodiment of the present invention.

ILLUSTRATIVE EMBODIMENT

A system such as that shown in the attached drawing is employed. The fuel used is particulate coal of 10 mesh average size containing 0.63 weight percent sulfur and 1.12 weight percent nitrogen. The coal is introduced into the fluidized-bed combustor 1 through a conduit 5 at a flow rate of 4850 pounds per hour. Air is introduced into the fluidized-bed combustor through the line 3 at the rate of 462,000 SCF/hr. In the fluidized bed 7 within the combustor, the coal is burned at an average bed temperature of 1550° F., and heat formed in the combustion is remoed in part by circulating steam within the steam coil 15. Coal ash is removed from the bed 7 through the conduit 17 at the rate of 335 pounds per hour. Gaseous combustion products are removed from the fluidized bed via the flue 19 at the rate of 513,000 SCF/hr. The gas in the flue 19 is analyzed prior to carrying out the present invention and is found to contain 600 ppm (volume) of $SO_x$ and 287 ppm (volume) of NO. According to the invention, 4.7 pounds per hour of ammonia are introduced through the line 21 into the air stream in conduit 3. The ammonia introduced into the bed through line 3 reacts with NO and oxygen in the fluidized bed 7 to form molecular nitrogen. After the system reaches a steady state of operation with constant ammonia addition, the gas in the flue 19 is again analyzed and is found to contain 600 ppm (volume) sulfur oxides and 100 ppm (volume) NO. Further according to the invention, limestone of 10 mesh average size is mixed with the coal in line 5 at a coal/limestone weight ratio of 10. In the fluidized bed 7, the limestone reacts with sulfur oxides, forming a sulfur-containing solid. The sulfur-containing solid is removed from the bed 7 in admixture with the coal ash through the conduit 17 at the rate of 677 pounds per hour. The gas in the flue 19 is then analyzed and is now found to contain only 50 ppm (volume) $SO_x$ and 100 ppm (volume) NO.

The preferred embodiment of the present invention having been described, a large number of variations and modifications of the invention within the scope of the appended claims will be apparent to those skilled in the art.

What is claimed is:

1. In a process including the steps of (1) forming a fluidized bed of particulate solid fuel including at least one nitrogen compound by passing a gas stream including molecular oxygen upwardly through said particulate fuel in a combustion zone, (2) forming NO-containing gaseous combustion products by combusting fuel in said bed with molecular oxygen at an average temperature in said bed of about 1400° F. to about 1800° F., and (3) removing said gaseous combustion products from said bed, the method for decreasing the amount of NO in said gaseous combustion products which comprises:

introducing ammonia or an ammonia-liberating compound into said bed and forming molecular nitrogen from said NO by reacting said ammonia with said NO and oxygen.

2. A method according to claim 1 wherein said gas stream comprises air, and ammonia is introduced into said bed in admixture with said air.

3. A method according to claim 1 wherein ammonia is introduced into said bed in admixture with said fuel.

4. A method according to claim 1 wherein said fuel includes a sulfur component, sulfur oxides are formed in said gaseous combustion products, and the amount of sulfur oxides in said gaseous combustion products is decreased by reacting sulfur oxides with at least one Group IIA metal or metal compound in said bed to form a particulate sulfur-containing solid.

* * * * *